United States Patent
Lee et al.

(10) Patent No.: US 8,438,639 B2
(45) Date of Patent: May 7, 2013

(54) APPARATUS FOR DETECTING AND FILTERING APPLICATION LAYER DDOS ATTACK OF WEB SERVICE

(75) Inventors: Tai Jin Lee, Seoul (KR); YongGeun Won, Seoul (KR); ChaeTae Im, Songpa Gu (KR); HyunChul Jeong, Seoul (KR)

(73) Assignee: Korea Internet & Security Agency (KR)

( * ) Notice: Subject to any disclaimer, the term of this patent is extended or adjusted under 35 U.S.C. 154(b) by 287 days.

(21) Appl. No.: 12/908,673

(22) Filed: Oct. 20, 2010

(65) Prior Publication Data

US 2011/0099622 A1 Apr. 28, 2011

(30) Foreign Application Priority Data

Oct. 22, 2009 (KR) ........................ 10-2009-0100835

(51) Int. Cl.
*H04L 29/06* (2006.01)

(52) U.S. Cl.
USPC .............................................. 726/22; 726/23

(58) Field of Classification Search ............... 726/22–25
See application file for complete search history.

(56) References Cited

U.S. PATENT DOCUMENTS

2008/0086434 A1* 4/2008 Chesla ............................ 706/12
2010/0100962 A1* 4/2010 Boren ............................. 726/25

FOREIGN PATENT DOCUMENTS

KR 2004-27705 4/2004

OTHER PUBLICATIONS

English language translation of the Abstract of KR Patent Publication No. 2004-27705.

* cited by examiner

*Primary Examiner* — Edward Zee
*Assistant Examiner* — Chi Nguy
(74) *Attorney, Agent, or Firm* — Cantor Colburn LLP

(57) ABSTRACT

Disclosed is a DDoS attack detection and response apparatus. The DDoS attack detection and response apparatus comprises: a receiver unit receiving HTTP requests from a client terminal which is characterized as an IP address; a data measuring unit computing the number of HTTP requests by IP and the number of URIs per HTTP over a certain time period; a DDoS discrimination unit comparing the number of HTTPs per URI with a threshold value and defining an access of the client terminal having the IP address as a DDoS attack when the number of HTTPs per URI is larger than the threshold value; and a blocking unit blocking packets from the IP address when the DDoS discrimination unit detects a DDoS attack.

12 Claims, 6 Drawing Sheets

APPARATUS FOR DETECTING AND FILTERING APPLICATION LAYER DDOS ATTACK OF WEB SERVICE

BACKGROUND OF THE INVENTION

1. Field of the Invention

The present invention relates to an electronic apparatus, especially to an application layer DDoS attack detecting and responding apparatus.

2. Description of the Related Art

Distributed Denial of Service (DDoS) attacks have long caused great damage, and recent botnet-based attacks such as Netbot Attacker, Blackenergy and 7.7 DDoS are making it more difficult to respond. The earlier DDoS attacks such as SYN, UDP, SYN+ACK and ICMP Flooding tended to consume bandwidth on the network layer. Recently, application-layer DDoS attacks which exploit the system's CPU, memory, DB server resources, etc, occurred including HTTP GET Flooding and Cache Control (CC) Attack.

Most of the existing DDoS defense tools are designed, however, to cope mainly with network layer DDoS attacks, not with application layer DDoS attacks such as Netbot Attacker and Blackenergy which generate small amount of HTTP traffics but make victim hosts unavailable. Various types of attacks can be carried out, including HTTP Get Flooding and CC Attack as well as the network-layer DDoS attacks.

In recent years, several studies have been reported to deal with the application-layer DDoS attacks. For example, given that IP addresses are not uniformly distributed in Web services and that users are likely to revisit the web site, by using traffic analysis, the proportion of regular users can be utilized in the detection of a DDoS attack. Using Web services usage pattern analysis, suspicious IP addresses can be classified as 'Greylist' to which less resources are allocated. Statistical approaches can be applied on the URL page-hit distribution in attempt to distinguish between a sudden spike in requests and a DDoS attack. Other defense methods are also proposed including the web usage path analysis and Admission Control for abnormal users.

Under the conventional technology, however, the URL page-hit distribution requires heavy computation, varies widely with time and contents to be delivered, and thus results in challenges with regard to a threshold configuration. The Admission Control method is deployed in an in-line configuration, not in out-of-path configuration, thus requiring session management.

The above mentioned background arts have been possessed or acquired in the course of eliciting the invention by the inventor. Therefore it is not conclusive that they are prior arts disclosed to the public.

SUMMARY OF THE INVENTION

The present invention aims to provide a DDoS attack detecting and defending apparatus capable of performing a defense mechanism with minimum arithmetic complexity.

The present invention aims to provide a DDoS attack detecting and defending apparatus capable of performing an application layer DDoS attacks detecting and defending algorithm applicable for web service which is a main target of the DDoS attacks.

Additional objects of the present will also be driven without difficulty through the following description.

One aspect of the present invention is a DDoS attack detection and response apparatus, the DDoS attack detection and response apparatus comprises: a receiver unit receiving HTTP requests from a client terminal which is characterized as an IP address; a data measuring unit computing the number of HTTP requests by IP and the number of URIs per HTTP over a certain time period; a DDoS discrimination unit comparing the number of HTTPs per URI with a threshold value and defining an access of the client terminal having the IP address as a DDoS attack when the number of HTTPs per URI is larger than the threshold value; and a blocking unit blocking packets from the IP address when the DDoS discrimination unit detects a DDoS attack.

In one example embodiment, the DDoS discrimination unit may define an access of the client terminal as a DDoS attack when equation below is satisfied.

$$threshold_3 < \frac{w_{T,s}}{n}$$

wherein $threshold_3$ is the threshold, $$w_{T,s} = \sum_{t=1}^{T} w_{t,s},$$

where $\omega_{t,s}$ is the HTTP Packet Per Second (PPS) at a unit time t from an IP s, T is the time period, and n is the number of requested URIs during the time period T.

In one example embodiment, the threshold may range from 2 to 5 when T is 10 seconds.

In one example embodiment, the DDoS discrimination unit may define an access of the client terminal as a DDoS attack when equation below is satisfied.

$$threshold_2 < p_{T,s,k}$$

wherein $threshold_2$ is the threshold, $$p_{T,s,t} = \sum_{t=1}^{T} p_{t,s,t},$$

where $p_{t,s,k}$ is the HTTP PPS for kth URI from an IP s at a unit time t, and T is the time period.

In one example embodiment, the threshold may range from 30 to 50 when T is 10 seconds.

In one example embodiment, the DDoS discrimination unit may define an access of the client terminal as a DDoS attack when equation below is satisfied.

$$\frac{threshold_1}{n} < \mu_{T,s}$$

wherein $threshold_1$ is the threshold, $$\mu_{T,s} = \frac{w_{T,s}}{n},$$

$$w_{T,s} = \sum_{t=1}^{T} w_{t,s},$$

where $\omega_{t,s}$ is the HTTP Packet Per Second (PPS) at a unit time t from an IP s, T is the time period, and n is the number of requested URIs during the time period T.

In one example embodiment, the threshold may range from 500 to 1000 when T is 10 seconds.

In one example embodiment, the DDoS attack detection and response apparatus may further comprise: an information storage unit gathering historical access information of the client terminal over a certain time period; and a resource allocation unit allocating limited resources to the client terminal with no visits over the certain time period by referring to the historical access information provided from the information storage unit when a HTTP request is received from the client terminal.

In one example embodiment, the DDoS attack detection and response apparatus may further comprise: a discrimination control unit comparing the number of HTTP requests per URI with the threshold value and activating the DDoS discrimination unit if the number of HTTP requests per URI is above a certain percentage of the threshold value.

In one example embodiment, the DDoS discrimination unit has a plurality of discrimination modes, and the DDoS attack detection and response apparatus may further comprise: a discrimination mode selecting unit detecting DDoS attacks by applying to a plurality of discrimination modes in a selective way In one example embodiment, when the length of the time period is changed, the threshold value may increase at a slower rate than an increasing rate of length of the time period, and the threshold value may decrease at a faster rate than a decreasing rate of length of the time period.

The present invention provides a DDoS attack detecting and defending apparatus capable of performing a defense mechanism with minimum arithmetic complexity.

The present invention provides a DDoS attack detecting and defending apparatus capable of performing an application layer DDoS attacks detecting and defending algorithm applicable for web service which is a main target of the DDoS attacks.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Figure 1:
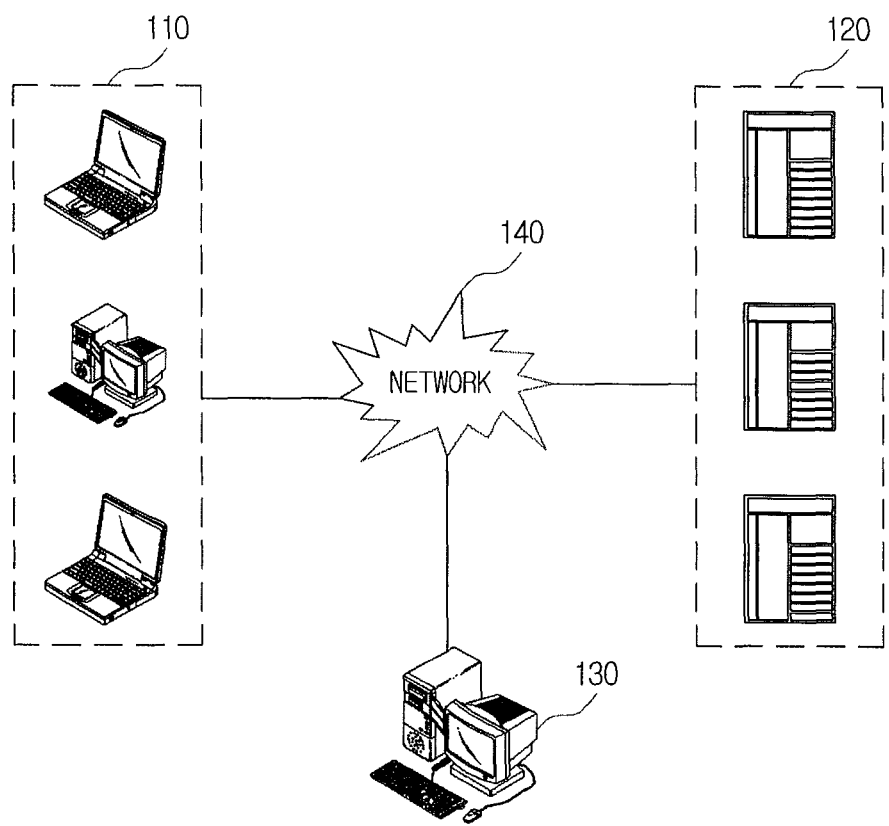
FIG. 1 is a schematic diagram of a DDoS defense system, according to an embodiment of the present invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein. Accordingly, example embodiments are to cover all modifications, equivalents, and alternatives falling within the scope of the invention.

It will be understood that, although the terms first, second, etc. may be used herein to describe various elements, these elements should not be limited by these terms. These terms are only used to distinguish one element from another.

It will be understood that, when a feature or element is referred to as being "connected" or "coupled" to another feature or element, it can be directly connected or coupled to the other element or intervening elements may be present. In contrast, when a feature or element is referred to as being "directly connected" or "directly coupled" to another element, there are no intervening elements present.

The terminology used herein is for the purpose of describing particular embodiments only and is not intended to be limiting of example embodiments of the invention. It will be understood that the terms "comprises," or "includes," when used herein, specify the presence of stated features, integers, steps, operations, elements, and/or components, but do not preclude the presence or addition of one or more other features, integers, steps, operations, elements, components, and/or groups thereof.

Like numbers are used throughout the drawings to refer to the same or like parts and a repetitive explanation will be omitted. Detailed descriptions of well-known functions and structures incorporated herein may be omitted to avoid obscuring the subject matter of the present invention.

The present invention can be modified in various ways and numerous embodiments of the invention can be devised. The present invention will now be described in detail in connection with preferred embodiments with reference to the accompanying drawings. However, the present invention is not limited to the disclosed embodiments, but is intended to encompass modifications, equivalents and alternatives as may be included within the spirit and scope of the invention as disclosed.

The terminologies used herein are for the purpose of describing particular embodiments only and are not intended to be limiting of the present invention. The singular forms are intended to include the plural forms as well, unless the context clearly indicates otherwise. It will be understood that the terms 'include' or 'comprise', when used herein, specify the presence of stated characteristics, numbers, steps, operations, elements, components, or any combinations of those, but do not preclude the presence or addition of one or more other characteristics, numbers, steps, operations, elements or components.

Further, when referring to the drawings for descriptive purposes, the same reference numbers will be used throughout the drawings to refer to the same parts and duplicate explanation will be omitted herein. Detailed descriptions of related technologies are omitted when appropriate, so as not to unnecessarily obscure the primary aspects of the present invention.

FIG. 1 is a schematic diagram of a DDoS defense system, according to an embodiment of the present invention. Referring to FIG. 1, the system is comprised of a client terminal 110, Web server 120, DDoS attack detection and response apparatus 130 and the network 140. The DDoS attack detection and response apparatus 130 can be placed in-line with network traffic, or be deployed out-of-path where traffic information is gathered separately.

One feature of the invention is that DDoS defense mechanisms of minimal computational loads are proposed by computing the number of HTTP requests per URI, summarizing IP-specific or overall distributional statistic such as an average, and comparing that statistic to a pre-defined threshold.

The client terminal 110, referred to as the so-called zombie PC, is a terminal launching a DDoS attack to the Web server 120. The DDoS attack detection and response apparatus 130 detects a DDoS attack from the client terminal 110 and blocks the access of the attacking terminal 110 to the Web server 120.

The DDoS attack detection and response apparatus 130 may be installed in the router on the network 140, placed on modified router, DDoS equipment, or protection system, or equipped as a component of the Web server 120 or as firewall. Further, although the present invention is mainly described in an example where the client terminal 110 launches a DDoS attack to the Web server 120, the present invention is not limited. For example, it is obvious to apply the present invention to DDoS attacks to various other objects such as websites and application servers, hardware module or software module.

The DDoS attack detection and response apparatus 130 implements algorithms for detecting and responding application-layer DDoS attacks targeted to Web services. That is, the DDoS attack detection and response apparatus 130 relates to defense mechanisms against a DDoS attack with possibly small amount of HTTP traffics per IP. Several embodiments of the invention will be described below in more detail.

Figure 2:
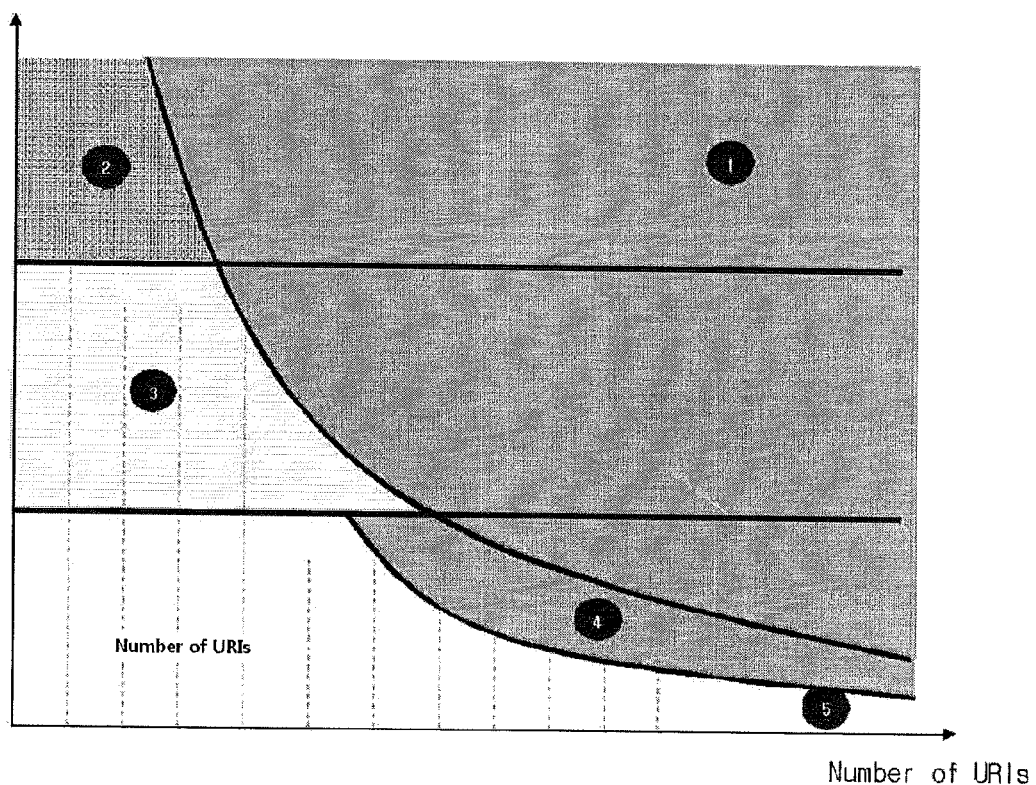
FIG. 2 is an explanatory drawing classifying the types of HTTP GET flooding attacks, according to an embodiment of the present invention.

FIG. 2 is an explanatory drawing classifying the types of HTTP GET flooding attacks, according to an embodiment of the present invention. Before further description of the preferred embodiment is provided, the HTTP traffics in Web services are classified.

Referring to FIG. 2, given an IP, X-axis represents the number of URIs over a time period, and Y-axis represents the number of HTTP requests per URI. Area (1) above the curve corresponds to the traditional GET Flooding attacks with large amount of HTTP traffics. Area (2) corresponds to the case where the number of HTTP requests per URI exceeds a certain threshold. Area (3) corresponds to the case where the average number of HTTP requests per URI exceeds a certain threshold. Area (4) corresponds to the DDoS attacks that can be detected by analyzing URI distribution. Area (5) corresponds to the DDoS attacks generating considerably small amount of traffics to many multiple URIs.

The type of attacks associated with Area (1) is the GET Flooding with large amount of HTTP requests per unit time by IP. The type of attacks associate with Area (2) is the GET Flooding with HTTP requests of above a threshold value for a certain URIs per unit time by IP. The type of attacks associated with Area (3) is the GET Flooding with average HTTP requests per URI per unit time exceeding a threshold value, by IP. The type of attacks associated with Area (4) is the GET Flooding with abnormally distributed URI requests per unit time by IP. The type of attacks associated with Area (5) is the GET Flooding with minimal HTTP requests for many multiple URIs per unit time by IP.

GET Flooding attacks on Web services can be classified into five types corresponding to the five areas in FIG. 2. Most of the past DDoS attacks correspond to Area (1), and the recent 7.7 DDoS attack corresponds to Area (2). Although other types of attacks have never occurred, it may happen in the future. Hereinafter, defense mechanism against each type of attacks described above will be presented.

Figure 3:
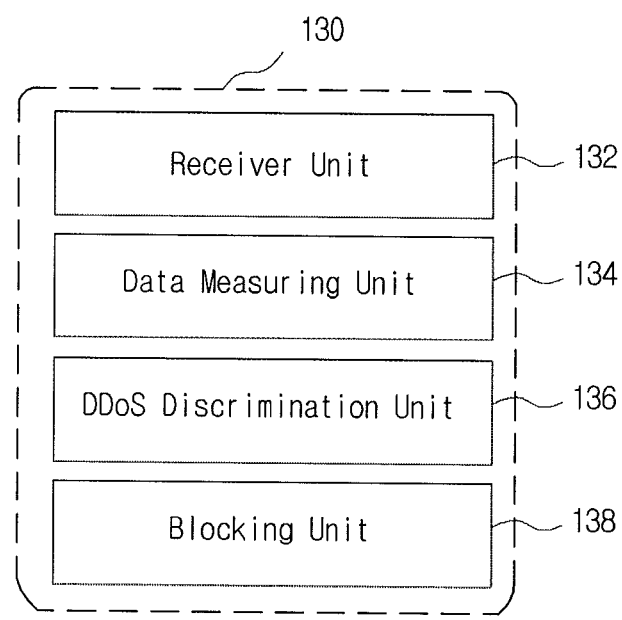
FIG. 3 is a block diagram of a DDoS attack detection and response apparatus, according to an embodiment of the present invention.

FIG. 3 is a block diagram of a DDoS attack detection and response apparatus, according to an embodiment of the present invention. Referring to FIG. 3, receiver unit 132, data measuring unit 134, DDoS discrimination unit 136 and blocking unit 138 are shown.

The receiver unit 132 is designed to receive HTTP requests from the client terminal 110 which is characterized as an IP address. The receiver unit 132 receives HTTP packets on TCP 80 port and parses the HTTP headers so as to enable the data measuring unit 134 to carry out analyses.

The data measuring unit 134 is designed to compute the number of HTTP requests by IP and the number URIs per HTTP over a certain time period. In more detail, the data measuring unit 134 indexes every received packet by IP and by URI and updates information. The present embodiment may further comprise a separate storage unit which stores the resulting data such as IPs, unit times, the number of HTTP requests and the number of URIs, etc. The hash/mod method can be applied in managing information by IP, or URI. However, since it will be easily implemented by those skilled in the art of the present invention, further description will not be provided.

The DDoS discrimination unit 136 is designed to compare the number of HTTP requests per URI with a pre-defined threshold value and to identify whether or not an access of the client terminal 110 of the corresponding IP is a DDoS attack. According to the present invention, threshold values can be categorized into 4 types, the present invention is not limited by terms for those threshold values. For instance, it can be referred to as the first through fourth threshold value. More details on the range of each threshold and the corresponding reference value are given below.

The DDoS discrimination unit 136 may comprise various algorithms to detect DDoS attacks, and each detection algorithm may be characterized as a discrimination mode. The present embodiment may further comprise a discrimination mode selecting unit (not shown) detecting DDoS attacks by applying to a plurality of discrimination modes in a selective way. That is, the discrimination modes can be individually implemented, and can be operated either sequentially or independently. For example, a discrimination mode may be always operated on particular IPs, or it may be conditionally active under abnormal circumstances. Such abnormal circumstances may include slowdown of the Web server 120 which is a typical DDoS symptom, and classification as a DDoS attack identified by discrimination modes which will be described below.

According to the present embodiment the DDoS discrimination unit 136 may include 5 classification algorithms corresponding to the 5 types of attacks described earlier, and a detailed description is provided below.

Considering HTTP traffic normally generated on Web services, the type of attacks associated with Area (1) seems to occur fairly frequently, so such attack is detected based on the total number of HTTP requests. The type of attacks associated with Area (2) is detected based on the number of HTTP requests per URI by IP. The type of attacks associated with Area (3) is detected based on the average number of HTTP requests per URI. The type of attacks associated with Area (4) is detected based on the analysis of the URI distribution. The type of attacks associated with Area (5) is detected based on the historical access information of the client terminal 110.

First, the defense mechanism against the type of attacks associated with Area (1) relates to a DDoS attack in which the number of HTTP requests over a unit time period by IP exceeds a certain threshold. Most of GET Flooding such as Blackenergy, Netbot Attacker and DoSHTTP generate more traffic, same as in Area (1), and thus the detection and blocking of this type of DDoS attacks can be carried out based on the threshold value.

For example, when comparing the GET Flooding traffic under the Netbot Attacker and the maximum possible HTTP traffic under the normal Web browser, the former is extremely high. That is, for the type of attacks associated with Area (1), the traffic is considerably high in volume compared with the normal Web service setting, making it easy to respond. A global threshold is set to be constant, however, given the y-axis of the number of HTTP requests per URI, the resulting constraints are given in curved form. The detection criterion for such type of DDoS attacks is given as follows:

$$\frac{threshold_1}{n} < \mu_{T,s} \quad (1)$$

Here, $threshold_1$ is a global threshold, T is a time period observed $$\mu_{T,s} = \frac{w_{T,s}}{n},$$

$$w_{T,s} = \sum_{t=1}^{T} w_{t,s},$$

where $\omega_{t,s}$ is the HTTP Packet Per Second (PPS) at time t of T from IP s n is the number of requested URIs during the time period T. Note that the unit time t is a time period, for example, 1 second. Then $\omega_{t,s}$ is the number of HTTP requests from IP s between time t and t+1. The detection and response of DDoS attacks can be implemented for every time-period T in the present embodiment, and in the embodiments examined below. The time period T is set to detect DDoS attacks in an effectively and timely manner, for example, 5~20 seconds. That is because, in Web services, it is difficult to $threshold_1$ may study the current user behaviors on a certain IP address using PPS. The range from 500 to 1000 with T of 10 seconds, and it may vary with the monitoring time period T.

Secondly, the defense mechanism against the type of attacks associated with Area (2) relates to a GET Flooding attack in which, by IP, the number of HTTP requests over a unit time period is below a threshold that is used to detect the type of attacks associated with Area (1) but the number of requests per URI is above a threshold. In the 7.7 DDoS attack recently occurred, by IP, the number of HTTP requests per is below a pre-defined threshold but the number of HTTP request per URI is above a threshold.

For example, in the 7.7 DDoS attack, the client terminal 110 generated traffic to multiple target systems simultaneously, requesting mostly the same URI. As a result, the HTTP PPS was about 315.5, and HTTP PPS at target systems was about 20. When considering the range of the proportion of requests for a single URI in the normal Web services, the maximum possible number of the same single URI generated in part by refreshing the web site as frequently as possible is about 26.22, and the threshold value can be set. The detection criterion for such type of DDoS attacks is given as follows:

$$threshold_2 < p_{T,s,k} \quad (2)$$

Here, $threshold_2$ is a local threshold, $$p_{T,s,t} = \sum_{t=1}^{T} p_{t,s,t},$$

where $p_{t,s,k}$ is the HTTP PPS for URI k from IP s at a unit time t. A DDoS attack can be detected by carrying out calculations of the above Equation (2) with k varying from 1 to n. For example, with T of 10 seconds, the threshold2 may range from 30 to 50. As mentioned earlier, the time period T may be set between 5 seconds and 20 seconds.

Also, the defense mechanism against the type of attacks associated with Area (3) relates to a DDoS attack in which the number of HTTP requests per URI over a unit time period is above a threshold. Here, the number of hits for each URI is not high enough to be detected as the type of attacks associated with Area (2). During a DDoS attack of such type, if the number of requested URIs is limited, the number of HTTP requests per URI would increase considerably, making it possible to be detected and responded.

For example, the number of HTTP requests per URI is about 1 during normal Web surfing. Although tens or even hundreds of HTTP are generated with a single click in the normal Web services, most of the files are for use with webpage configuration (gif, jps, js, iframes, etc). Thus, the number of hits for a single URI is limited to the cases where user opens a new web browser, clicks on the menu or the link, or refreshes the current webpage. The detection criterion for such type of DDoS attacks is given as follows:

$$threshold_3 < \frac{w_{T,s}}{n} \quad (3)$$

Here, threshold3 is an average threshold which may range, for example, from 2 to 5 when T is 10 seconds. As mentioned earlier, the time period T may be set between 5 seconds and 20 seconds.

When applying to the above-described defense mechanisms based on the number of HTTP requests per URI, any DDoS attack targeting to limited URIs can be detected. However, a DDoS attack associated with many large URIs may not be identified by the defense mechanism against the type of attacks associated with Area (3). In such cases, if the distribution of URI hits is concentrated in a particular URIs, it can be detected and responded by abnormality on traffic distribution. The defense mechanism against the type of attacks associated with Area (4) relates to the detection method using the URI distribution and it can be applied even to attacks with small amount of HTTP traffic.

Also, the defense mechanism against the type of attacks associated with Area (5) relates to the history-based detection method. The history-based method is applied when the system is overloaded but no DDoS attack is identified yet. According to an embodiment of the present invention, when the defense mechanisms fail to detect, the rate-limit method is applied to suspicious IPs. The IP users tend to revisit the pages in Web services. Therefore, when the IP addresses are divided into returning IP or new IP, the returning IP are classified as regular users, and the new IP are classified as either new legitimate users or attackers. Usually the proportion of the returning IP is overwhelmingly high. However, during a DDoS attack, the proportion of the new IP increases sharply, which makes it possible to detect the attack. In such case, a DDoS attack can be responded by allocating limited resources (say, less than or equal to 20% of resources) to new IP addresses.

In order for this, the present embodiment may further comprise an information storage unit (not shown) gathering historical access information of the client terminal 110 over a certain time period, and a resource allocation unit (not shown) allocating limited resources to the client terminal 110 with no visits over the certain time period by referring to the historical access information provided from the storage unit when a HTTP request is received from the client terminal 110.

The blocking unit 138 blocks packets by IP when the IP is detected via the DDoS discrimination unit 136. When a DDoS attack from a particular IP address is identified, the blocking unit 138 copes with the DDoS attack by blocking packets from the client terminal 110 with the corresponding IP.

Further, the present embodiment may further comprise another unit for preliminary detection of system abnormality that is to be operated prior to the DDoS discrimination unit 136 and the blocking unit 138. That is, according to the present embodiment, the DDoS attack detection and response apparatus 130 can be operated only when abnormal symptoms are noticed including slow access to the Web server 120 and system overload, then it is expected to reduce the server load and to increase calculation efficiency. The present embodiment may further comprise a discrimination control unit (not shown) comparing the number of HTTP requests per URI derived from the above-described embodiments with the threshold values and activating the DDoS discrimination unit 136 if the number of HTTP requests per URI is above a certain percentage of the threshold values.

Here, the percentage used to the preliminary detection may be fixed as a default value, automatically configured with the network or server environment, or manually adjusted by users. In the automatic configuration setting, the percentage is adjusted according to the network/server overload frequency, intensity, etc. For example, when the overloads are frequently present, the circumstance is considered suspicious and thus the percentage is increased accordingly. In the manual configuration setting, the present embodiment can include a user interface system to adjust the percentage. The percentage, for example, may be 50% to 70% of the thresholds mentioned earlier (i.e., global threshold, local threshold, average threshold).

Further, the time period T described earlier can be adjusted according to the operating environment, service characteristics, etc, and the threshold values described earlier can be changed accordingly. When the length of time period is changed, the threshold values may increase at a slower rate than an increasing rate of length of time period, and the threshold values may decrease at a faster rate than a decreasing rate of length of time period. For example, for the type of attacks associated with Area (2), as the time period T increases by a factor of 2 (i.e., 20 seconds), the local threshold may increase by a factor of 1.5 (i.e., 45~75). On the other hand, when the time period T changes by a factor of 0.5 (i.e., 5 seconds), the local threshold may change by a factor of 0.75 (i.e., 22.5~37.5). This reflects that DDoS symptoms may not proportionally increase as the monitoring time increases. It is evident that such adjustments can be made according to the operating environment and service characteristics.

Figure 4:
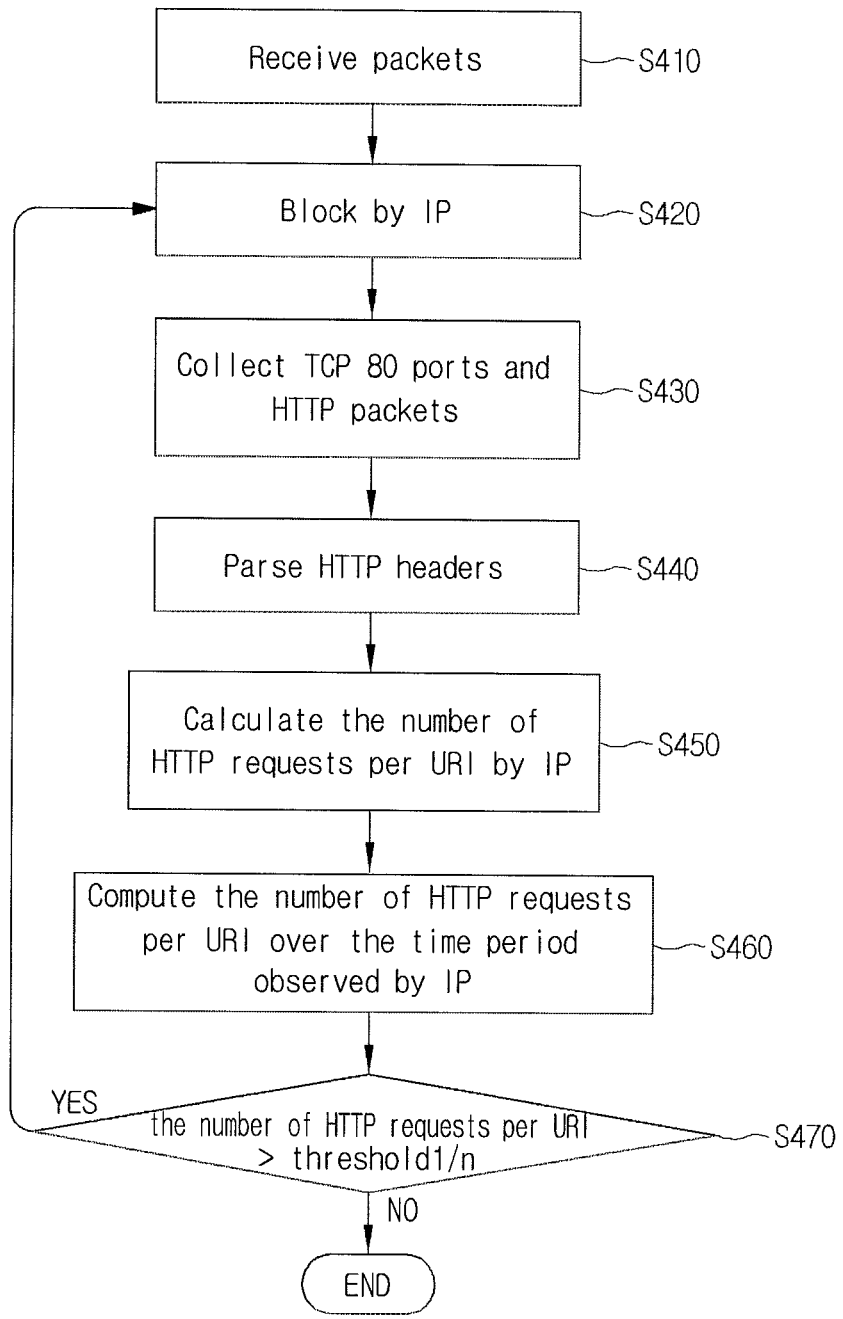
FIG. 4 is an illustrative flow chart for a method of detecting and responding a DDoS attack, according to an embodiment of the present invention.

FIG. 4 is an illustrative flow chart for a method of detecting and responding a DDoS attack, according to an embodiment of the present invention. This flow chart relates to be the defense mechanism against the type of attacks associated with Area (1) by the DDoS attack detection and response apparatus 130.

In step S410, a packet is received from the client terminal 110. The client terminal 110 which classified as a DDoS attackers by ID is blocked in step S420. Here, if the IP of the client terminal 110 is identified as a new IP, then the corresponding new IP may be stored in a database.

TCP 80 ports and HTTP packets are collected in step S430, and HTTP headers are parsed in step S440. For example, under the present embodiment, a fast kernel-based traffic control engine may be implemented to collect HTTP packets from NDIS intermediate Driver or a kernel-object packet pool and to parse HTTP headers.

In step S450, the number of HTTP requests per URI is computed by IP. In step S460, as described earlier, the number of HTTP requests per URI over a time period T is computed by IP.

In step S470, the number of HTTP requests per URI is compared to the above-stated global threshold. If the number of HTTP requests per URI is greater than (or possibly equal to the same hereafter) the global threshold value divided by the number URL requests (n) in time T, then access from the client terminal 110 with the corresponding IP address is blocked at step S420. Also, if the number of HTTP requests per URI is less than the threshold, the corresponding IP access is maintained.

Figure 5:
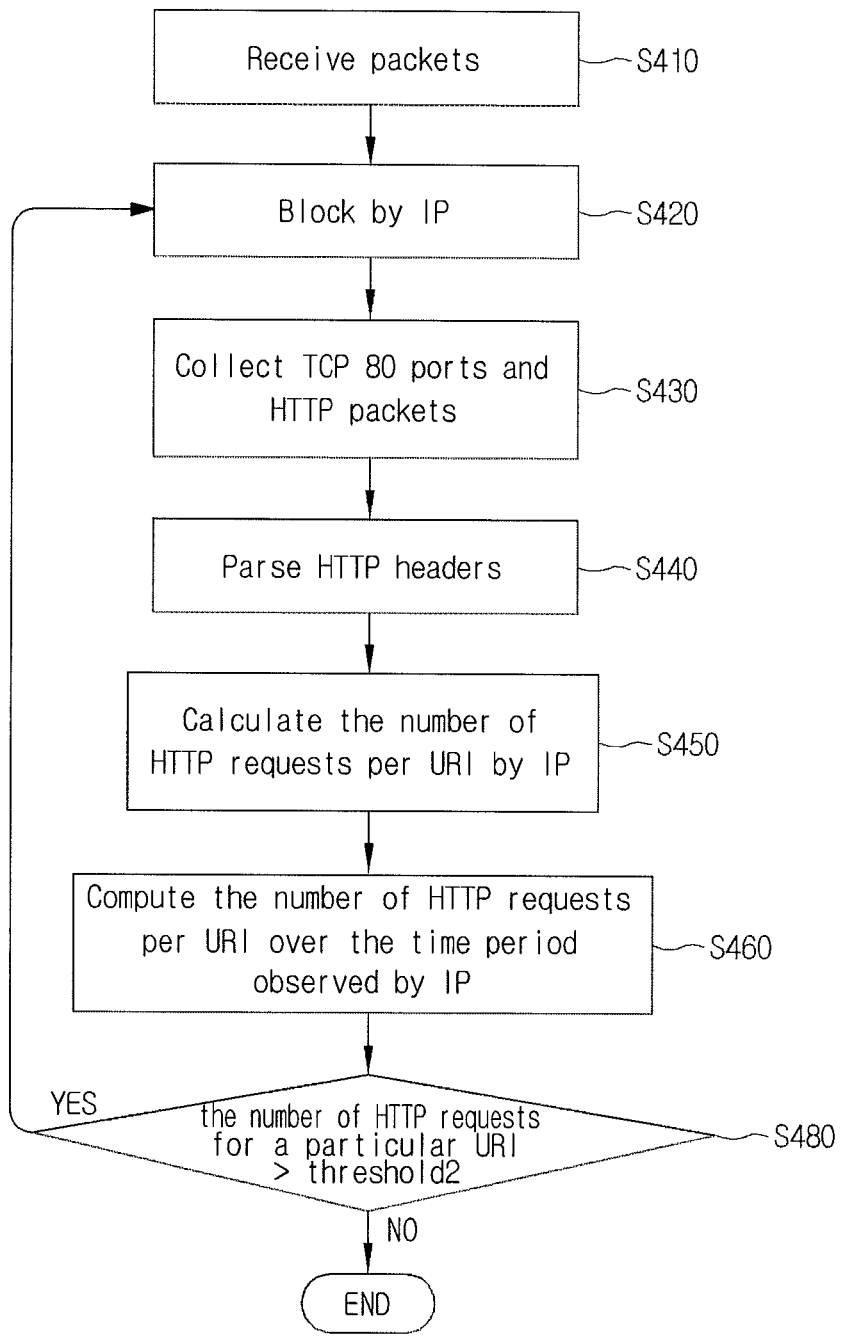
FIG. 5 is an illustrative flow chart for a method of detecting and responding a DDoS attack, according to another embodiment of the present invention.

FIG. 5 is an illustrative flow chart for a method of detecting and responding a DDoS attack, according to an embodiment of the present invention. This flow chart relates to the defense mechanism against the type of attacks associated with Area (2) by the DDoS attack detection and response apparatus 130. The following description will be focused on the main differences among the above embodiments.

In step S480, by IP, the number of HTTP requests for each URI is compared to the above-stated local threshold. If the number of HTTP requests is greater than the local threshold, access from the client terminal 110 with the corresponding IP address is blocked at step S420. Also, if the number of HTTP requests is less than the local threshold, the corresponding IP access is maintained.

Figure 6:
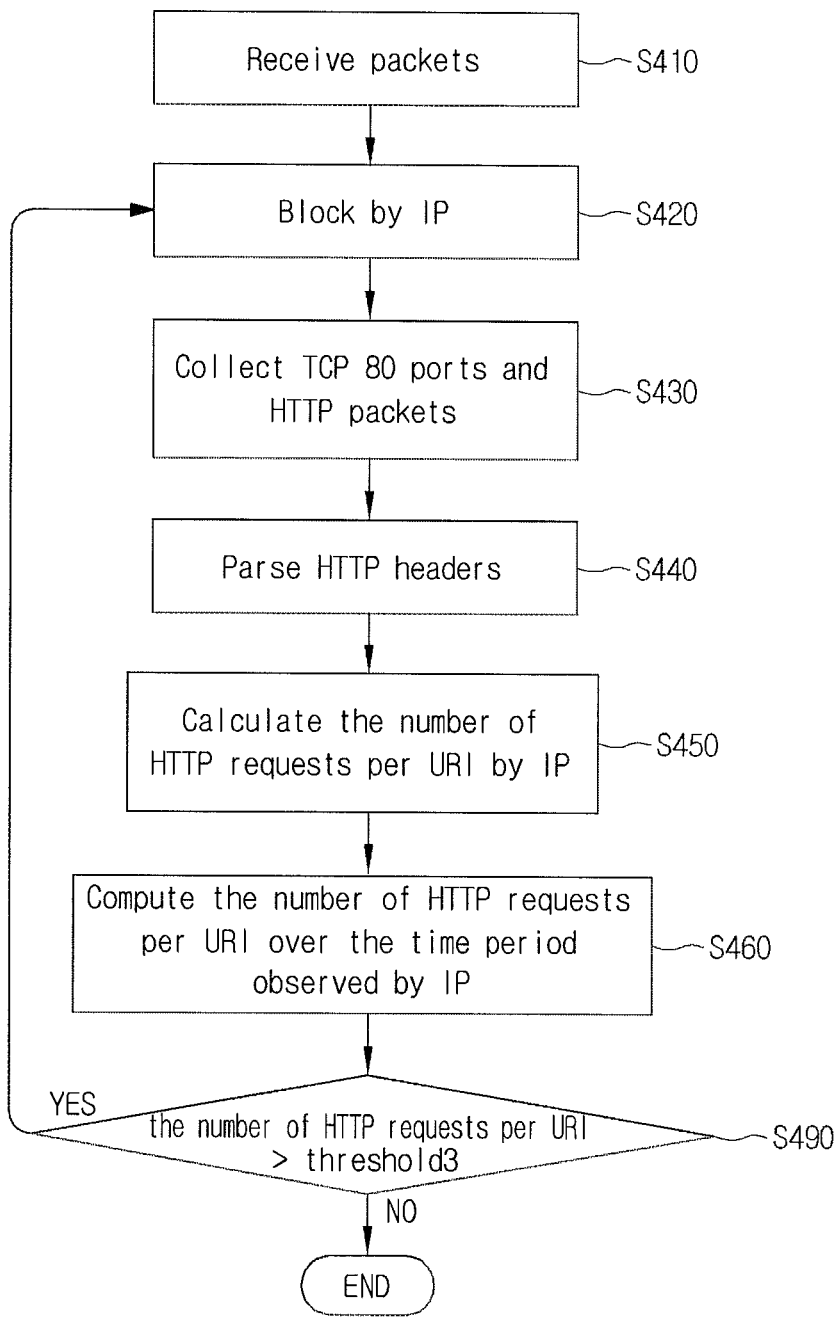
FIG. 6 is an illustrative flow chart for a method of detecting and responding a DDoS attack, according to still another embodiment of the present invention.

FIG. 6 is an illustrative flow chart for a method of detecting and responding a DDoS attack, according to an embodiment of the present invention. This flow chart relates to the defense mechanism against the type of attacks associated with Area (3) by the DDoS attack detection and response apparatus 130. The following description will be focused on the main differences among the above embodiments.

In step S490, the average number of HTTP requests per URI is compared to the above-stated average threshold. If the number of HTTP requests per URI is greater than the average threshold, access from the client terminal 110 with the corresponding IP address is blocked at step S420. Also, if the number of HTTP requests is less than the average threshold, the corresponding IP access is maintained.

Furthermore, regarding to embodiments of the present invention, detailed system diagram of a DDoS detection and response tool, common platform technology such as O/S, interface standardization such as communication protocol and I/O interface are obvious to a person having ordinary skill in the art, so they are omitted.

According to the embodiments of the present invention, the equations and thresholds are presented when detecting and responding DDoS attacks. However, the present invention is not limited to this method. It will be understood that other specifications on equations or thresholds showing similar results are under the scope of the present invention. It will be also understood that, within the spirit and scope of the present invention, various changes and modification can be made to the invention by the ordinary skilled in the art.

What is claimed is:

1. A DDoS attack detection and response apparatus comprising:
   a receiver unit receiving HTTP requests from a client terminal which is characterized as an IP address;
   a data measuring unit computing a number of HTTP requests by IP address and a number of URIs per HTTP over a certain time period;
   a DDoS discrimination unit comparing a number of HTTPs per URI with a threshold value and defining an access of the client terminal having the IP address as a DDoS attack when the number of HTTPs per URI is larger than the threshold value; and
   a blocking unit blocking packets from the IP address when the DDoS discrimination unit detects a DDoS attack, wherein the DDoS discrimination unit defines the access of the client terminal as the DDoS attack when an equation below is satisfied:

$$threshold_3 < \frac{w_{T,s}}{n},$$

Wherein $threshold_3$ is the threshold value, $$w_{T,s} = \sum_{t=1}^{T} w_{t,s},$$

where $\omega_{t,s}$ is a HTTP Packet Per Second (PPS) at a unit time t from an IP address s, T is a time period, and n is a number of requested URIs during the time period T.

2. The DDoS attack detection and response apparatus of claim 1, wherein the threshold value ranges from 2 to 5 when T is 10 seconds.

3. The DDoS attack detection and response apparatus of claim 2, wherein when a length of the time period is changed, the threshold value increases at a slower rate than an increasing rate of length of the time period, and the threshold value decreases at a faster rate than a decreasing rate of length of the time period.

4. The DDoS attack detection and response apparatus of claim 1, wherein the DDoS discrimination unit defines an access of the client terminal as a DDoS attack when an equation below is satisfied:

$$threshold_2 < p_{T,s,k}$$

wherein $threshold_2$ is the threshold value, $$p_{T,s,t} = \sum_{t=1}^{T} p_{t,s,t},$$

where $p_{t,s,k}$ is the HTTP PPS for $k^{th}$ URI from an IP address s at a unit time t, T is the time period, and k varying from 1 to n.

5. The DDoS attack detection and response apparatus of claim 4, wherein the threshold value ranges from 30 to 50 when T is 10 seconds.

6. The DDoS attack detection and response apparatus of claim 5, wherein when the length of time period is changed, the threshold value increases at a slower rate than an increasing rate of length of time period, and the threshold value decreases at a faster rate than a decreasing rate of length of time period.

7. The DDoS attack detection and response apparatus of claim 1, wherein the DDoS discrimination unit defines an access of the client terminal as a DDoS attack when an equation below is satisfied:

$$\frac{threshold_1}{n} < \mu_{T,s}$$

wherein $threshold_1$ is the threshold value, $$\mu_{T,s} = \frac{w_{T,s}}{n},$$

$$w_{T,s} = \sum_{t=1}^{T} w_{t,s},$$

where $\omega_{t,s}$ is the HTTP Packet Per Second (PPS) at a unit time t from an IP address s, T is the time period, and n is the number of requested URIs during the time period T.

8. The DDoS attack detection and response apparatus of claim 7, wherein the threshold value ranges from 500 to 1000 when T is 10 seconds.

9. The DDoS attack detection and response apparatus of claim 8, wherein when the length of time period is changed, the threshold value increases at a slower rate than an increasing rate of length of time period, and the threshold value decreases at a faster rate than a decreasing rate of length of time period.

10. The DDoS attack detection and response apparatus of claim 1, further comprising: an information storage unit gathering historical access information of the client terminal over a certain time period; and a resource allocation unit allocating limited resources to the client terminal with no visits over the certain time period by referring to the historical access information provided from the information storage unit when a HTTP request is received from the client terminal.

11. The DDoS attack detection and response apparatus of claim 1, further comprising a discrimination control unit comparing the number of HTTP requests per URI with the threshold value and activating the DDoS discrimination unit if the number of HTTP requests per URI is above a certain percentage of the threshold value.

12. The DDoS attack detection and response apparatus of claim 1, wherein the DDoS discrimination unit has a plurality of discrimination modes, and further comprising a discrimination mode selecting unit detecting DDoS attacks by applying to a plurality of discrimination modes in a selective way.

* * * * *